United States Patent [19]
Lemaire et al.

[11] Patent Number: 6,093,223
[45] Date of Patent: *Jul. 25, 2000

[54] AGGREGATES OF CERIC OXIDE CRYSTALLITES AND REDUCTION OF VEHICULAR EMISSIONS THEREWITH

[75] Inventors: Jacques Lemaire, Osny; Denis Petta, Lyons; Olivier Touret, Aubervilliers, all of France

[73] Assignee: Rhone-Poulenc Chimie, Courbevoie Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,792

[22] Filed: Nov. 4, 1996

Related U.S. Application Data

[63] Continuation of application No. 08/387,355, Feb. 13, 1995, abandoned, which is a continuation of application No. 08/156,649, Nov. 24, 1993, abandoned.

[30] Foreign Application Priority Data

Nov. 25, 1992 [FR] France ................................ 92-14158

[51] Int. Cl.$^7$ .................................. C10L 1/12; C10L 1/30
[52] U.S. Cl. ................................. 44/354; 44/358; 44/363; 44/500
[58] Field of Search .............................. 44/354, 363, 358, 44/500

[56] References Cited

U.S. PATENT DOCUMENTS

| | | | |
|---|---|---|---|
| 4,036,605 | 7/1977 | Hartle | 44/362 |
| 4,065,544 | 12/1977 | Hamling et al. . | |
| 4,264,335 | 4/1981 | Bello et al. . | |
| 4,568,357 | 2/1986 | Simon | 44/354 |
| 4,599,201 | 7/1986 | Gradeff et al. . | |
| 4,621,593 | 11/1986 | Rao et al. . | |
| 4,836,830 | 6/1989 | Gradeff et al. . | |
| 4,965,057 | 10/1990 | David et al. . | |
| 5,017,352 | 5/1991 | Chane-Ching et al. . | |
| 5,064,803 | 11/1991 | Nunan . | |
| 5,354,439 | 10/1994 | Forat et al. . | |
| 5,449,387 | 9/1995 | Hawkins et al. | 44/364 |
| 5,674,985 | 10/1997 | Hawkins et al. | 534/16 |

FOREIGN PATENT DOCUMENTS

| | | |
|---|---|---|
| 0190492 | 8/1986 | European Pat. Off. . |
| 190492 | 8/1986 | European Pat. Off. . |
| O368834 | 5/1990 | European Pat. Off. . |

OTHER PUBLICATIONS

Journal of Materials Science Letters, vol. 9, No. 10, Oct. 1990, London GB pp. 1205–1206, M. Maria Amala Sekar "Combustion Synthesis of Fine–Particle Ceria".

Sekar et al, "Combustion Synthesis of Fine–Particle Ceria", *Journal of Material Science Letters*, 9(10), 1990, pp. 1205–1206.

*Primary Examiner*—Jerry D. Johnson
*Attorney, Agent, or Firm*—Burns, Doane, Swecker & Mathis, L.L.P.

[57] ABSTRACT

Vehicular emissions are reduced/purified via combustion of the hydrocarbon fuel therefor, e.g., diesel fuel, in the presence of a cerium compound, preferably a cerium (IV) compound, to produce soots having depressed ignition temperatures that contain effective purifying amounts of aggregates of ceric oxide crystallites, the largest particle size dimension of which ranging from 50 Å (5 nanometers) to 10,000 Å (1,000 nanometers) and the crystallite sizes of which, measured by Debye-Scherrer technique, ranging from 50 Å (5 nanometers) to 250 Å (25 nanometers).

17 Claims, No Drawings

AGGREGATES OF CERIC OXIDE CRYSTALLITES AND REDUCTION OF VEHICULAR EMISSIONS THEREWITH

CROSS-REFERENCE TO COMPANION APPLICATION

Hawkins and Mauermann application Ser. No. 08/077,362, filed Jun. 17, 1993, now abandoned and assigned to the assignee hereof.

This application is a continuation, of application Ser. No. 08/387,355, filed Feb. 13, 1995, now abandoned which is a continuation, of application Ser. No. 08/156,649, filed Nov. 24, 1993 now abandoned.

BACKGROUND OF THE INVENTION

1. Field of the Invention

The present invention relates to novel ceric oxide crystallite aggregates, and, more especially, to particular ceric oxide crystallite systems well suited for catalyzing the complete combustion of hydrocarbon fuels, in particular heavy fuels (gasoline, diesel fuel).

This invention also relates to the production of such novel aggregates and to the use thereof in reducing the emission of residues, e.g., soot and carbon particulates, from internal combustion engines.

2. Description of the Prior Art

During the combustion of diesel fuel in diesel engines, the carbon-containing products have a tendency to form soots which are reputed to be harmful both in respect of the environment and from a health and safety standpoint.

This art has long sought to reduce the emission of such carbon-containing particles, hereinafter simply designated by the expression "soots."

These efforts include the goal not to increase the emission of carbon monoxide or of gases considered to be toxic and mutagenic, such as the nitrogen oxides.

A wide variety of solutions have been proposed to reduce these carbon-containing emissions. One approach that is increasingly gaining in popularity is to equip the vehicular exhaust line with a filter, or soot trap, designed to trap all of the carbon-containing particles produced by combustion of the various combustible materials or fuels. Compare U.S. Pat. No. 4,621,593.

However, this technique is severely limited by the storage capacity of the filter which must be either emptied or incinerated. Such regeneration operation is extremely expensive to provide and to implement. One of the most commonly proposed solutions is the combustion of these soots, at particular intervals, either by electric heating or by using a fossil fuel igniter.

This particular technique nonetheless presents disadvantages, not the least of which is the risk of thermal shock giving rise to fracturing or cracking of the ceramic filter.

One solution which would be satisfactory would entail introducing catalysts into the soots which would initiate frequent self-ignition of the soots collected in the filter. To accomplish this, these soots must have a self-ignition temperature which is sufficiently low as to be frequently attained during normal running of, e.g., an internal combustion engine. Stated differently, it has been recognized that soot, collected from the exhaust gases of a diesel engine, can be more readily removed or eliminated by oxidation if the exhaust gas includes an agent which codeposits with the soot and depresses or catalyzes the ignition temperature of the soot.

SUMMARY OF THE INVENTION

Accordingly, a major object of the present invention is the provision of well-defined aggregates which serve as self-ignition catalysts of the soots formed during the combustion of carbon-containing combustible materials.

Another object of the present invention is the provision of well-defined aggregates which permit lowering of the auto- or self-ignition temperature of such soots.

Still another object of the present invention is the provision of such aggregates which permit reducing the amount of soots formed during the combustion of said combustible materials when it is present in the combustion chamber therefor.

Another object of the present invention is the provision of such aggregates which, when present in combustion chambers, does not increase the emission of nitrogen oxide and of carbon monoxide.

Yet another object of this invention is the provision of a process for the manufacture and/or for the introduction of said particular aggregates in the combustion chamber in the immediate vicinity of the soots.

Yet another object of this invention is the provision of particular technique for the use of such aggregates.

Briefly, the present invention features novel ceric oxide crystallite aggregates, the largest dimension of said aggregates ranging from 20 Å (2 nanometers) to 10,000 Å (1,000 nanometers), preferably from 50 Å (5 nanometers) to 5,000 Å (500 nanometers), and further wherein the size of the crystallites, measured for the (111) plane by the Debye-Scherrer technique, ranges from 20 Å to 250 Å (2 to 25 nanometers), preferably from 100 Å to 200 Å.

In the following description, the particle size distribution is characterized by $d_{20}$, $d_{50}$ and $d_{80}$, $d_{20}$ being a particle size at which 20% of the particles have a smaller size, $d_{50}$ being a particle size at which 50% of the particles have a smaller size and 50% of the particles have a larger size, and $d_{80}$ being a particle size at which 80% of the particles have a smaller size.

DETAILED DESCRIPTION OF PREFERRED EMBODIMENTS OF THE INVENTION

More particularly according to the present invention, it will be appreciated that the aforesaid measurements are virtual measurements and that it doubtless would be more strictly accurate to refer to the width of the X-ray peak.

This is the reason the technique for measuring crystallite size according to the Scherrer technique will subsequently be more fully described.

It will also be appreciated that the positional zeros are not significant figures, except where expressly indicated.

It is preferable that the subject aggregates are topologically as close as possible to the soots, which is why it is desirable to introduce said aggregates into the combustion chamber, or to produce same in situ, such that these aggregates can simultaneously be formed and serve as seed materials for the soots.

It is advisable, for efficiency, to add, or to form "in situ," cerium oxide in the aggregate form specified above in an amount of at least 10 ppm with respect to the carbon-containing fuel, preferably 20 ppm and more advantageously 50 ppm.

It is preferred that the cerium oxide thus formed has a particle size such that its $d_{80}$ is at most equal to 10,000 Å (1,000 nanometers), preferably at most 5,000 Å (500 nanometers).

It is also preferred that its $d_{20}$ be greater than 200 Å (20 nanometers) and preferably greater than 500 Å (50 nanometers).

The present invention also features soots containing the above aggregates, the auto- or self-ignition temperature thereof being lowered with respect to that of aggregate-free soots.

To this end, soots are provided having a particle size such that the particulates have a $d_{20}$ equal to at least 100 Å and such that the $d_{80}$ thereof is at most equal to 1,000 Å and which contains at least 0.01% by weight, advantageously at least 0.1%, preferably at least 0.5%, of the aggregates according to the present invention.

Generally, the soot particles form masses whose $d_{50}$ ranges from 2,000 to 5,000 Å.

In one embodiment of the present invention, the soots thus formed have a total cerium content ranging from 1% to 5% by weight, preferably from 1.5% to 2.5%.

As indicated above, the crystallite aggregate is advantageously formed during the combustion of the fuel, or of the combustible material, the latter being treated with at least one cerium compound, preferably tetravalent, in the solution or sol form.

When the cerium compound is selected from among cerium (IV) compounds, it additionally presents the advantage of being available at high concentrations which reduces the size of the storage tank, as hereinbefore discussed. It is thus possible to obtain a cerium concentration which can attain a value of 15%, ofttimes 20% and even 30%.

Another advantage of the tetravalent cerium compounds is their stability, which is greater than that of trivalent compounds.

The preferred crystallite aggregates are those produced in situ by combustion of a combustible material, or fuel, (which may or may not contain additives, such as diesel fuel) containing at least one cerium (IV) compound (in the sol or solution form) such as, for example, those described in European Patent Application No. 83/401,152.0, in U.S. Pat. No. 4,599,201 and in the aforesaid '362 Hawkins et al copending application (each assigned to the assignee hereof).

It has now been determined that said cerium (IV) compound is advantageously selected from among the sols thereof.

To produce a crystallite aggregate of good quality, it is preferable to burn the sols obtained by, preferably extemporaneously, dilution in a combustible material, or fuel, of a concentrated sol (at least 15% to 20% of cerium oxide ($CeO_2$)) in a petroleum fraction, such as that marketed under the trademark Solvesso® 150 and stabilized by preferably linear $C_{15}$ to $C_{25}$ fatty acids such as oleic, linoleic and linolenic and/or stearic acids, the hydrodynamic size of the particles constituting the sol being at most equal to approximately 100 Å (10 mμ), advantageously ranging from 1 to 20 millimicrons (millimicron=nanometer).

The cerium concentration in the combustible material, and in particular in diesel fuel, advantageously ranges from 10 to 20 ppm, preferably from 50 to 150 ppm.

The present invention also features reducing the formation of soots during combustion of hydrocarbonaceous fuels and especially of diesel fuel.

This invention also features a technique for decreasing the self-ignition temperature of soots.

Stated differently, this invention features the combustion of a hydrocarbon fuel, during which the subject aggregates are introduced into the combustion chamber, or are therein formed in situ.

In order to further illustrate the present invention and the advantages thereof, the following specific examples are given, it being understood that same are intended only as illustrative and in nowise limitative.

In said examples to follow, the following analytical techniques/principles were observed.

DETERMINATION OF THE SIZE OF THE CRYSTALLITES ACCORDING TO THE SCHERRER METHOD

Introduction

Diffraction results from the interaction of radiation with matter. When an electromagnetic wave strikes an atom, its electrons are subjected to vibrations at the same frequency as the incident wave.

The absorption and the reemission of the atoms in a periodic lattice constitute X-ray diffraction. The Bragg diffraction law, which results from specific optical and crystallographic conditions, provides the diffracted intensity maxima. Three aspects of such a maximum are of value to the analyst: the position of the peak, its intensity and its width. Here, only the third aspect makes it possible to determine certain characteristics of the particle size.

Broadening of the Diffraction Peaks

In the absence of any disrupting effects, the peaks obtained should be Dirac peaks. Experimentally, such curves are not obtained, due to the influence of the apparatus and the morphology of the crystals. Indeed, the divergence and dispersion in wavelength of the incident beam of X-rays, the absorption and the surface state of the sample, the width of the analysis slit, and the like, are among the many so-called "Instrumental broadening factors."

In addition, the size and the deformation of the crystals cause so-called Intrinsic broadening of the curves. The smaller the crystals, the greater the importance of the contribution to the broadening of the peak. On the other hand, broadening is an increasing function of deformation.

The experimental curve is thus the convolution of the Instrumental curve and of the Intrinsic curve.

MEASUREMENT OF CRYSTALLITE SIZES OF THE CERIUM OXIDE:

All of the methods for calculating the size D of the crystallites were based on the mathematical characterization of the diffraction peaks. Two types of parameters were mainly used.

(a) The mid-height width FWMH, and/or the integral width, b, of the peak (width of a rectangle of the same height and of the same area as the peak under consideration).

(b) The Fourier coefficients of the peak.

In the present case, the Scherrer technique was used, the principle of which is more fully explained below. Its application required the removal beforehand of the Instrumental broadening (since an experimental diffraction curve, described as H, is the convolution of an Instrumental curve, described as G, and of an Intrinsic curve, described as F).

Deconvolution

The spectrum was recorded of a reference sample of sufficiently large size and with a sufficiently low deformation for the broadening observed to be solely instrumental, the chemical nature of the reference additionally being as close as possible to that of the samples under investigation.

The derivation of the curve F from the curves H and G was then carried out manually from the mid-height width values, determined previously using software for the analysis of spectra.

To carry out such deconvolution, the Gauss formula was used:

FWMH(F)²=FWMH(H)²−FWMH(G)²

Once the characteristic parameters of the spectrum F were known, it was possible to calculate the size of the crystallites.

Scherrer Technique

In this technique, the deconvolution was thus carried out by assuming that the curves were gaussian and then D was determined for each hkl line according to the following equation:

$$D = \frac{K x \lambda}{FWMH(F) * \cos\beta}$$

DETERMINATION OF CRYSTALLITE SIZES:

The size of the crystallites of cerium oxide was measured in the direction perpendicular to the plane with (hkl) indices=(111) corresponding to the most intense line.

Calculation of the crystallite size was carried out according to the Scherrer technique from the following constants:

Scherrer constant K=0.90 wavelength used λ=1.542 angstrom

The angular widths (expressed in radians in the Scherrer formula) were the mid-height widths of the (111) peaks. The measurements were carried using Philips PW1700 diffractometers, the instrumental width of which in this angular range was 0.126 (in degrees).

The error was estimated at +/−25 angstrom.

TECHNIQUE FOR SAMPLING THE SOOTS:

The measurements were carried out on 4.4 L Mercedes 240D diesel engine automobiles, tuned according to the specifications of the manufacturer.

The vehicles were equipped with a manual gearbox. The dynamometric chassis simulated an inertia of 1,300 kilos with a power absorption unit marketed by Schenck, type W130.

The exhaust gases were cooled, then transported through a particle trap and finally through a dilution tunnel which included means for sampling of the exhaust prior to discharge to the atmosphere.

The sampling of the particles was carried out on sampling filters covered with Teflon, marketed by Pallflex Products Corp., type 47 mm TX40 H120-WW, the temperature being adjusted such as not to exceed 52° C.

The particle trap was a Corning EX 47, 5.66"×6.00" trap equipped with 3M Interam III in a metal box. It was placed upstream of the dilution tunnel, from which tunnel it was possible to remove the particles which had escaped from the filter and collected while cold.

MEASUREMENTS ON THE PARTICLE EMISSIONS:

The particle emissions were determined and evaluated according to 91/441/EEC directives.

DETERMINATION OF THE REGENERATION TEMPERATURE:

The tests were always begun using a clean filter. The regeneration temperature was measured after having charged the particle trap via three successive FTP75 cycles.

The trap was situated such that the maximum temperature recorded inside the trap during the accumulation stage of the soots was less than 230° C.

In order to determine the regeneration temperature, the vehicle was operated at a constant speed (90 km/h) in 4th gear at the maximum load on the engine.

Taking account of the specificity of the exhaust system, the temperature of the exhaust gases at the trap inlet increasing slightly, the pressure drop through the trap and the temperature were recorded as a function of time.

During this regeneration stage (due to the stationary state of the engine), the exhaust gases supplying the trap indicated a rising temperature, but a constant mass flow rate and a constant oxygen content.

The mass of particles accumulated in the trap during the measurement remained negligible.

The increase in temperature and in volume flow rate caused an increase in the pressure drop across the trap, until the regeneration temperature was reached. For subsequent temperature increases, the pressure drop remained constant and then declined. This was due to the reduction in the mass of the particles accumulated in the trap. The trap was cleaned.

The results obtained via the above techniques are reported in the following Table 1:

The engine was supplied with diesel fuels whose cerium content was 100 ppm.

The tests reported in Table 1 were carried out using one particular type of diesel fuel.

The tests of Table 2 were carried out using another type of diesel fuel.

The measurements were carried out with the Kα line of copper. The width of the line of the device was 0.12.

TABLE 1

| Synthesis | Size of the soots | Size of the aggregates in nm | Width of the (hkl) = (111) peak | Size of the crystallites | Width of the (hkl) = (200) peak | Size of the crystallites | Self-ignition temperature (° C.) | Observation |
|---|---|---|---|---|---|---|---|---|
| Organic sol having a 10 nm hydrodynamic diameter (oleic sol) | $d_{50} = 40$ $d_{20} = 15$ $d_{80} = 60$ | $d_{50} = 15$ $d_{20} = 5$ $d_{80} = 200$ | 606 | 138 Å | 0.572 | 138 Å | 486 | g |

TABLE 1-continued

| Synthesis | Size of the soots | Size of the aggregates in nm | Width of the (hkl) = (111) peak | Size of the crystallites | Width of the (hkl) = (200) peak | Size of the crystallites | Self-ignition temperature (° C.) | Observation |
|---|---|---|---|---|---|---|---|---|
| Blank | $d_{50} = 40$<br>$d_{20} = 20$<br>$d_{80} = 60$ | | | — | | | 570 | g |

TABLE 2

| Synthesis | Size of the soots | Size of the aggregates in nm | Width of the (hkl) = (111) peak | Size of the crystallites | Width of the (hkl) = (200) peak | Size of the crystallites | Self-ignition temperature (° C.) | Observation |
|---|---|---|---|---|---|---|---|---|
| Organic sol having a 10 nm hydrodynamic diameter (oleic sol) | $d_{50} = 30$<br>$d_{20} = 15$<br>$d_{50} = 50$ | | | 230 Å | | 175 Å | 495<br>490<br>502<br>493 | |
| Organic sol having a 100 nm hydrodynamic diameter (oleic sol) | $d_{50} = 30$<br>$d_{20} = 15$<br>$d_{80} = 50$ | | | >300 Å<br>** | | | 519<br>(515 + 505 + 538)/3 | Outside the invention (comparative) |
| Cerium (IV) salts | $d_{50} = 30$<br>$d_{20} = 15$<br>$d_{80} = 50$ | | | 220 Å | | 180 Å | (472 + 490 + 490)/3<br>484 | |
| Blank | $d_{50} = 40$<br>$d_{20} = 20$<br>$d_{80} = 80$ | | | — | | — | 561 =<br>(561 + 556 + 565)/3 | |

**Semi-quantitative

The production of soots and the measurements carried out directly on the vehicle were very complex and required a considerable amount of time. Hence, another study was conducted using soots which were similar, but simpler to obtain.

PREPARATION OF THE CRUDE LABORATORY SOOTS:

A ceramic tube was placed in a Pyrex oven (VG50/350 4.4 kw L=700 mm).

A 2/98 by volume mixture of oxygen and nitrogen was injected at one end therein at a flow rate of 300 l/h and diesel fuel was sprayed therein.

The temperature of the gases at the center of the oven was 1,200° C.

The soots were collected at the other end on a "Whatman" glass fiber filter maintained at 180° C.

After pyrolyzing for 3 hours, the soots were recovered by scraping the filter and then ground.

PREPARATION OF LABORATORY SOOTS CONTAINING ADDITIVES:

The procedure was the same as for the crude laboratory soots, but the diesel fuel contained a metal additive such that the metal concentration in the diesel fuel ranged from 100 to 10,000 ppm.

This concentration was adjusted such that the soot contained metal at a concentration similar to those observed in engine test bed soots (i.e. approximately 2%).

PREPARATION OF IMPREGNATED LABORATORY SOOTS:

The particular additive was diluted 30 times in a volatile solvent kerdane, dichloromethane, ethanol and/or water. The solution was added with stirring to a dispersion of crude laboratory soot dispersed in the same solvent. The solvent was slowly evaporated and the soots were ground.

EVALUATION OF THE SOOTS BY THERMOGRAVIMETRIC ANALYSIS TGA:

The TGA was a Setaram apparatus.

The carrier gas was air at a flow rate of 48 ml/min.

The boat contained 20 mg of soot.

The temperature was programmed from 20° C. to 900° C. at 10° C./min.

The temperature and the weight of the soot were recorded as a function of time.

The degree of combustion, obtained by deriving the weight as a function of time, was calculated point by point.

It was thus possible to determine the temperature "T max" whereat the degree of combustion was maximum and the ignition temperature "T ig" which is the temperature at the intersection of the base line with the tangent to the mass curve as a function of time at the temperature T=T max.

The results obtained are reported in the following Table 3:

TABLE 3

| Agent for impregnating the soot | Crystallite size | Particle size | T ig (° C.) | T max (° C.) |
|---|---|---|---|---|
| Aqueous sol | 3 to 4 nm | 3 to 4 nm | 355 | 375 |
| Organic sol | 3 to 5 nm | 3 to 5 nm | 385 | 392 |
| Organic sol having a | | | | |

TABLE 3-continued

| Agent for impregnating the soot | Crystallite size | Particle size | T ig (° C.) | T max (° C.) |
|---|---|---|---|---|
| 10 nm hydrodynamic diameter (oleic sol) Coarser sol | 11 nm | 11 nm | 375 | 390 |
| Organic sol having a 100 nm hydrodynamic diameter (oleic sol) Coarse sol | — | 30 to 40 nm | 400 | 430 |
| Opaline | >50 nm | 800 nm | 494 | 572 |
| Blank | | | 500 | 580 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A hydrocarbon fuel soot produced by combustion of diesel fuel, the soot containing at least 0.1% by weight of aggregates consisting essentially of ceric oxide crystallites, the largest particle size dimension of which ranging from 50 Å to 10,000 Å and the crystallite sizes of which, measured by Debye-Scherrer technique, ranging from 50 Å to 250 Å, wherein the soot exhibits an ignition temperature of less than 400° C.

2. The hydrocarbon fuel soot containing aggregates of ceric oxide crystallites as defined by claim 1, said largest particle size dimension ranging from 100 Å to 5,000 Å and said crystallite sizes ranging from 100 Å to 200 Å.

3. The hydrocarbon fuel soot containing aggregates of ceric oxide crystallites as defined by claim 1, the aggregates having a particle size distribution characterized by $d_{20}$ and $d_{80}$, $d_{20}$ being a particle size at which 20% of the aggregates are smaller and $d_{80}$ being a particle size at which 80% of the aggregates are smaller, the $d_{80}$ of the aggregates being at most 10,000 Å and the $d_{20}$ of the aggregates being greater than 200 Å.

4. The hydrocarbon fuel soot containing aggregates of ceric oxide crystallites as defined by claim 1, the crystallites having a particle size distribution characterized by $d_{20}$ and $d_{80}$, $d_{20}$ being a particle size at which 20% of the crystallites are smaller and $d_{80}$ being a particle size at which 80% of the crystallites are smaller, the $d_{80}$ of the crystallites being at most 5000 Å and the $d_{20}$ of the crystallites being greater than 500 Å.

5. A process for the production of the aggregates of ceric oxide crystallites as defined by claim 1, comprising burning a hydrocarbon fuel in the presence of a seed amount of said aggregates of said ceric oxide crystallites.

6. A hydrocarbon fuel soot produced by combustion of diesel fuel, the soot comprising soot particles having a particle size distribution characterized by $d_{20}$ and $d_{80}$, $d_{20}$ being a particle size at which 20% of the soot particles are smaller and $d_{80}$ being a particle size at which 80% of the soot particles are smaller, the $d_{20}$ of the soot particles being at least 200 Å and the $d_{80}$ of the soot particles being at most 1000 Å, said soot comprising at least 0.1% by weight of the aggregates consisting essentially of ceric oxide crystallites, the largest particle size dimension of which ranging from 50 Å to 10,000 Å and the crystallite sizes of which, measured by Debye-Scherrer technique, ranging from 50 Å to 250 Å, wherein the soot exhibits an ignition temperature of less than 400° C.

7. The hydrocarbon fuel soot as defined by claim 6, comprising at least 0.5% by weight of said aggregates of ceric oxide crystallites.

8. The hydrocarbon fuel soot as defined by claim 6, having a total cerium content ranging from 1% to 5% by weight.

9. The hydrocarbon fuel soot as defined by claim 8, having a total cerium content ranging from 1.5% to 2.5% by weight.

10. The hydrocarbon fuel soot as defined by claim 6, the soot comprising soot particles having a particle size characterized by $d_{50}$, $d_{50}$ being a particle size at which 50% of the soot particles are smaller and 50% of the soot particles are larger, the $d_{50}$ of the soot particles ranging from 2000 Å to 5000 Å.

11. A vehicular soot trap containing the hydrocarbon fuel soot as defined by claim 6.

12. A process for the production of the aggregates of ceric oxide crystallites comprising burning a hydrocarbon diesel fuel in the presence of at least one cerium compound and collecting a hydrocarbon fuel soot containing at least 0.1% by weight of said aggregates, said aggregates consisting essentially of ceric oxide crystallites, the largest particle size dimension of which ranging from 50 Å to 10,000 Å and the crystallite sizes of which, measured by Debye-Scherrer technique, ranging from 50 Å to 250 Å, wherein the soot exhibits an ignition temperature of less than 400° C.

13. The process as defined by claim 12, said at least one cerium compound comprising a cerium (IV) compound.

14. The process as defined by claim 13, said cerium (IV) compound comprising a sol thereof.

15. The process as defined by claim 14, comprising diluting said sol in a concentrated form in said hydrocarbon fuel.

16. The process as defined by claim 12, carried out in an internal combustion engine.

17. The process as defined by claim 16, said at least one cerium compound being formed in situ in said internal combustion engine.

* * * * *